United States Patent [19]

Thomas

[11] Patent Number: 5,277,063
[45] Date of Patent: Jan. 11, 1994

[54] SINGLE PLANE TRIM BALANCING

[75] Inventor: Thumpassery J. Thomas, Erie, Pa.
[73] Assignee: General Electric Company, Erie, Pa.
[21] Appl. No.: 769,617
[22] Filed: Oct. 1, 1991
[51] Int. Cl.[5] ............................................. G01M 1/22
[52] U.S. Cl. ........................................ 73/457; 73/462
[58] Field of Search ............... 73/457, 458, 462, 468; 364/463, 508

[56] References Cited

U.S. PATENT DOCUMENTS

| | | | |
|---|---|---|---|
| 2,541,863 | 10/1948 | Oakley | 73/68 |
| 2,799,168 | 7/1957 | Federn et al. | 73/462 |
| 2,983,148 | 5/1961 | White | 73/465 |
| 3,751,987 | 8/1973 | Whitmore | 73/465 |
| 4,098,127 | 7/1978 | Shiga et al. | 73/462 |
| 4,926,341 | 5/1990 | Guyot | 73/462 |
| 5,008,826 | 4/1991 | Staudinger et al. | 364/463 |
| 5,011,374 | 4/1991 | Miller | 416/144 |

*Primary Examiner*—John E. Chapman
*Attorney, Agent, or Firm*—R. Thomas Payne

[57] ABSTRACT

A method for balancing a rotor of an alternator in a diesel-electric locomotive in which the rotor is drivingly coupled to a power output shaft of a diesel engine. A speed sensor and a vibration sensor are coupled to the rotor for providing output signals representative of instantaneous rotational velocity and instantaneous amplitude of vibrational motion of the rotor, respectively. In the inventive method, the rotor is accelerated to a first preselected rotational velocity and a first rotor unbalance is determined from the velocity and vibration signals. The rotor is then accelerated to a second preselected rotational velocity and a second rotor unbalance is determined. The first and the second rotor unbalance determinations are combined to identify a first correction weight and position thereof for minimizing the first and the second rotor unbalance. The identified weight is installed and the process repeated until the unbalance is corrected such that vibration is less than a preselected maximum value.

7 Claims, 4 Drawing Sheets

Microfiche Appendix Included
(1 Microfiche, 59 Pages)

SINGLE PLANE TRIM BALANCING

This application includes a microfiche appendix of one sheet containing fifty-nine frames.

BACKGROUND OF THE INVENTION

The present invention relates to balancing of rotors of large dynamoelectric machines and, more particularly, to in situ balancing of a rotor of an alternator operatively coupled to a shaft of an internal combustion engine and assembled in a locomotive.

Balancing of rotating apparatus, from automobile tires to aircraft gas turbine engines, is a generally known process. Typically, the apparatus is placed on some form of fixture and rotated at preselected speeds. The fixture has built-in electronics for detecting out of balance conditions and indicating to an operator a mass of weight and the location for adding the mass so as to correct the unbalance condition. Some of these balancing machines may provide for gross corrections, such as with tire balancing, while others may provide for very fine balancing, such as is required for gas turbine engines. The first may sense the forces induced in the machine by the rotating apparatus while the latter may use highly expensive, non-contacting vibration sensing equipment, such as dynamic trim balancing analyzers of the type described in U.S. Pat. No. 3,751,987. These latter type machines, while very accurate, are not generally adapted for use in detecting unbalance in large dynamoelectric machines mounted in an operating system. Initial balancing of rotors of large dynamoelectric machines is generally performed in the same manner as with other rotating apparatus, i.e., before installation in an operating system. However, such initial balancing is often not sufficient to meet the requirements for vibration when the rotor is installed in the dynamoelectric machine and further installed in an operating environment. In particular, when the rotor is operatively coupled to a shaft of an internal combustion engine, the additional vibration induced by the engine may be sufficient to excite undesirable vibrations in the dynamoelectric machine and in the equipment in which the machine is installed. Accordingly, it would be advantageous to provide a method and apparatus which can be used in a manufacturing environment to detect and correct unbalance in a large dynamoelectric machine when the machine is installed in an operating locomotive or similar electric traction vehicle.

SUMMARY OF THE INVENTION

The above and other disadvantages of the prior art are overcome in a system for balancing a large dynamoelectric machine, herein exemplified as an alternator, while the alternator is installed in an operating condition in a traction vehicle such as a locomotive. The alternator is driven by an internal combustion engine, typically a diesel engine, which can be set to run at a plurality of preselected speeds. Trim balancing is accomplished by use of a speed sensor and an accelerometer coupled to the rotor of the alternator. The signals from the speed sensor and the accelerometer are connected to a commercial spectrum analyzer. A computer, such as a personal computer (PC), is coupled to the spectrum analyzer for reading the vibration amplitude and phase angle determined by the spectrum analyzer. The PC computes the location and mass of any needed weights to correct the unbalance to within acceptable limits.

In an illustrative embodiment, the alternator rotor yoke is manufactured with a plurality of equally spaced, drilled and tapped holes specially adapted for receiving and attaching balance weights. Prior to operating the alternator, a marker is attached to the rotor yoke in line with one of the holes. The speed sensor is an optical sensing device positioned on a stationary mount adjacent the marker such that the speed sensor can detect the instantaneous rotational velocity of the rotor by detecting the passage of the marker. The speed sensor signal also provides information to the spectrum analyzer for determining the phase angle of the vibration relative to the marker. An accelerometer is attached to the stationary frame of the alternator at a preselected position. The accelerometer output signal is used by the spectrum analyzer to detect vibration amplitude.

In the inventive method, vibration amplitude and phase angle are measured without any balance weights at a first preselected speed and in a first preselected direction, e.g., in a lateral direction. The process is then repeated for a second preselected speed and in a second preselected direction, e.g., in a vertical direction. The computer calculates the estimated location and magnitude of a weight to correct any measured unbalance. The initial weights are bolted to the alternator yoke and the above process repeated. If the vibration amplitude with the initial weights is outside acceptable limits, trim balancing is repeated until the unbalance is acceptable.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Single plane trim balancing is applicable where vibration is caused by a force unbalance and where there is negligible couple unbalance. This has been found to be the case for the single bearing alternators used on locomotives. If an unbalanced couple is present, trim balancing will have to be done using two planes for attaching balance weights. The present invention deals with single plane balancing only.

Figure 1:
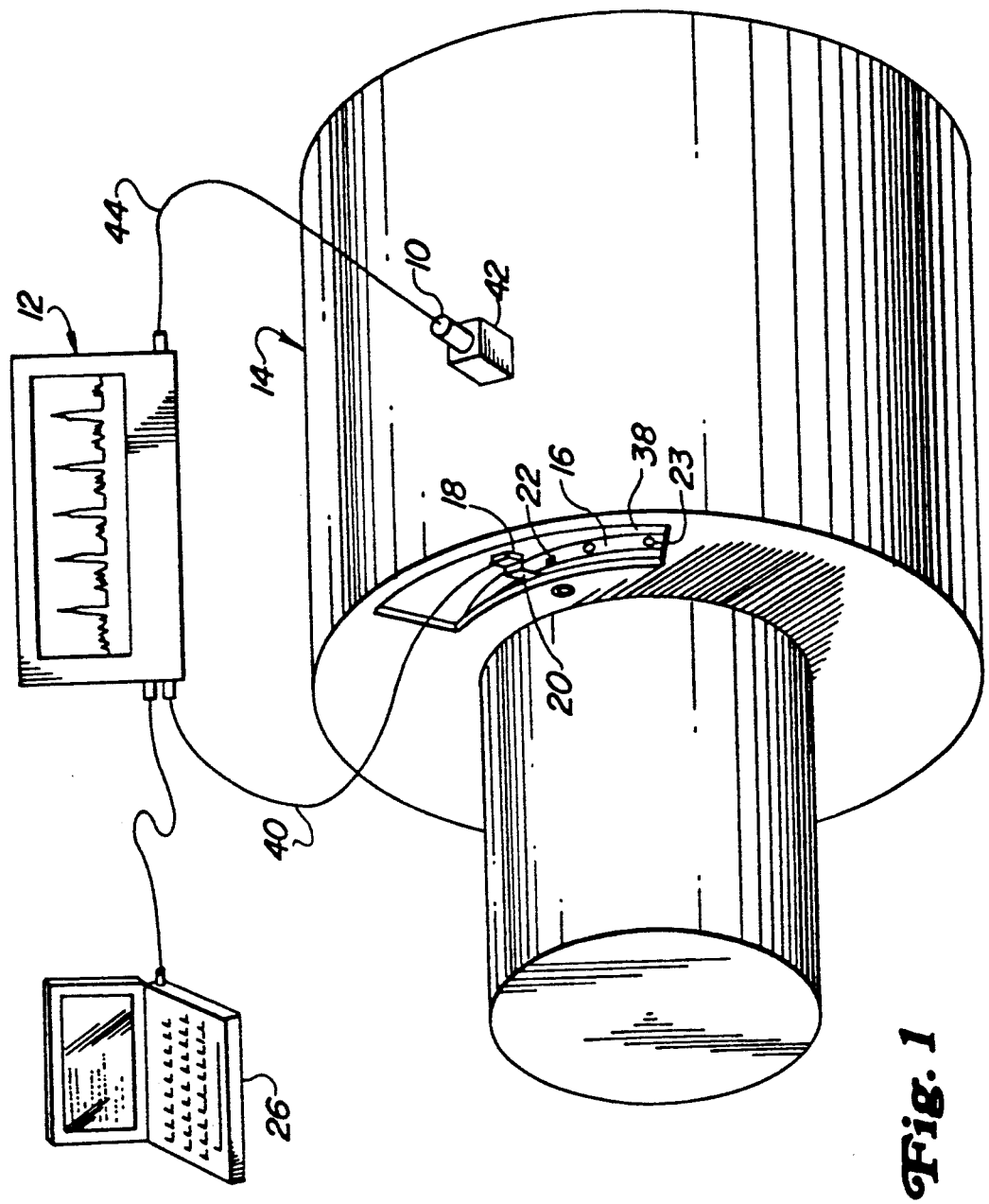
FIG. 1 is a simplified illustration of an alternator showing an implementation of the present invention for measuring imbalance of the alternator rotor.

In the method of the present invention, FIG. 1 shows an accelerometer 10 connected to a spectrum analyzer 12 used to measure the amplitude of vibration (at the frequency of rotation) at a particular position on the alternator 14. In this case, the 3 o'clock position near the middle of alternator 14 has been selected. The phase angle of the vibration signal with respect to a reference position on the alternator rotor yoke 16 is obtained from an optical sensor 18 which also inputs its signal into the spectrum analyzer 12.

The optical sensor 18 is mounted, for purposes of this test, to a bracket 20 which is bolted to casing of alternator 14. Bracket 20 supports sensor 18 adjacent rotor yoke 16. The radially outer surface of rotor yoke 16 is preferably darkened, such as by painting black, and a reflective marker 22 attached to the outer surface. The marker 22 may comprise a small piece of reflective tape allowing light reflected from the marker to be detected by sensor 18. The rotor yoke 16 includes a plurality of circumferentially spaced, threaded apertures 23 which can be used to attach small weights to the rotor to correct any unbalance condition.

The spectrum analyzer 12 is a commercially available analyzer such as the ONO SOKKI Co., Ltd. type CF-250 which can be controlled by external commands from a personal computer (PC) 26. The computer 26 is connected to analyzer 12 for obtaining vibration amplitude and phase angle. Computer 26 computes the balance weight and location necessary to reduce vibration in a manner described below.

Figure 2:
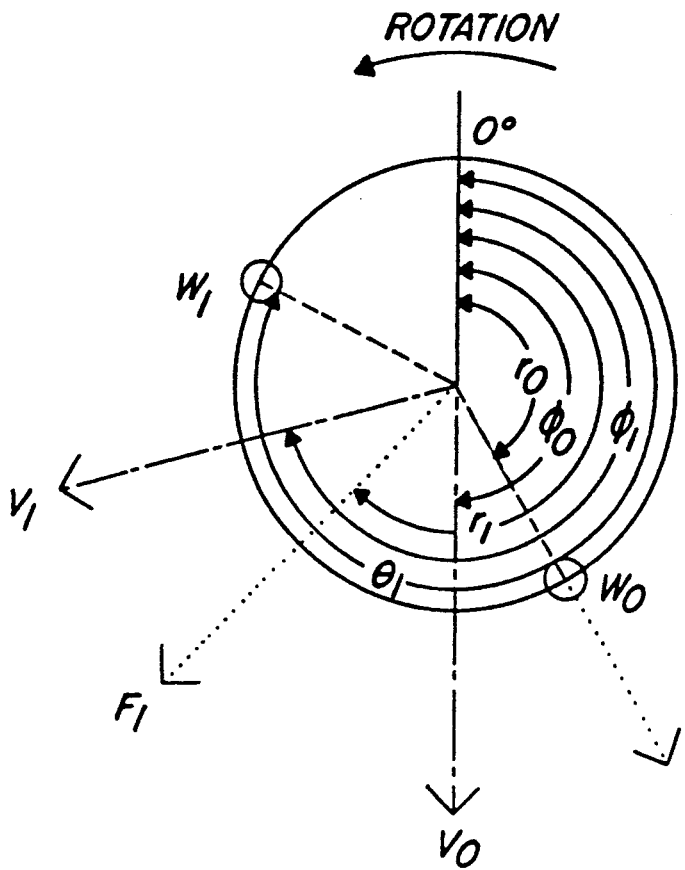
FIG. 2 is a schematic representation of the alternator of FIG. 1 illustrating the forces and angles affecting balance of the rotor.

FIG. 2 is a schematic representation of the alternator rotor 16 illustrating the forces, weights, and angles used in determining an unbalance condition. The vibration amplitude and phase angle measured, without any balance weights, i.e., baseline data, are denoted by $V_0$ and $\phi_0$. The angles are measured in the direction opposite to the direction of rotation of rotor 16. If the direction of rotation is counterclockwise, then positive angles are measured in the clockwise direction from the reference position, which is the position of the reflecting tape or marker 22 adjacent optical sensor 18 in FIG. 1.

A linear relationship is assumed between the unbalanced weight $W_0$ (in gm-inches) and the vibration amplitude it produces, $V_0$. This can be represented by the equation:

$$W_0 = V_0 x \alpha \quad (1)$$

where $\alpha$ is a constant.

There is also a difference between the location of the unbalanced force $W_0$ and phase angle of the measured vibration $V_0$. If the position of the unbalanced force is denoted by $\Gamma_0$, this relationship can be represented by the equation:

$$\Gamma_0 = \phi_0 - \beta x RPM \quad (2)$$

where $\beta$ is a constant and RPM is the rotational speed of the rotor in RPM.

If a known trial weight $W_1$ is attached to rotor 16 at position $\theta_1$ ($W_1$ is the weight in gm-inches corresponding to the attached trial weight), the unbalanced force now acting on the rotor is the vector sum of the forces due to $W_0$ and $W_1$ and is represented by $F_1$ at a position $\Gamma_1$. The vibration measured with the trial weight attached is denoted by $V_1$ and the phase angle of the measured vibration is denoted by $\phi_1$.

The following equations can be written:

$$F_1 = V_1 x \alpha \quad (3)$$

$$\Gamma_1 = \phi_1 - \beta x RPM \quad (4)$$

Taking components of the forces, the following equations can be written:

$$F_1 x \cos(\Gamma_1) = W_0 x \cos(\Gamma_0) + W_1 x \cos(\theta_1) \quad (5)$$

$$F_1 x \sin(\Gamma_1) = W_0 x \sin(\Gamma_0) + W_1 x \sin(\theta_1) \quad (6)$$

Substituting for $W_0$, $\Gamma_0$, $F_1$, and $\Gamma_1$ in equations (5) and (6) gives:

$$V_1 x \alpha \cos(\phi_1 - \beta x RPM) = V_0 x \alpha \cos(\phi_0 - \beta x RPM) + W_1 x \cos(\theta_1) \quad (7)$$

$$V_1 x \alpha \sin(\phi_1 - \beta x RPM) = V_0 x \alpha \sin(\phi_0 - \beta x RPM) + W_1 x \sin(\theta_1) \quad (8)$$

Equations (7) and (8) are solved for $\alpha$ and $\beta$ in terms of the known variables. $W_0$ and $\Gamma_0$ are now calculated from equations (1) and (2). The balance weight is equal to $W_0$ and its position is at $\Gamma_0 + 180°$.

In practice, the first trial weights are determined by using estimated values of the coefficients $\alpha$ and $\beta$ based on data from several alternators that have been balanced. This would give a trial weight that would be close in magnitude and position to the final balance weight used.

On the locomotive, there are controls that cause the engine and alternator 14 to operate at one of several preset speeds (RPM) and a corresponding power setting. At notch 8, alternator 14 is operating at a speed of 1050 RPM and maximum horsepower. Notch 1 is the lowest power setting. It has been observed that on the locomotives currently being trim balanced, the highest vibrations on alternator 14 initially are at notch 8 in the vertical direction. It has also been observed that balancing alternator 14 at notch 8 can adversely affect the lateral vibration at notch 2 (speed about 580 RPM). In general, an initial survey would have to be done at all operating speeds before and after trim balancing to ensure all sensitive vibration modes are monitored and controlled during the balancing procedure. For this reason, in practice, both the notch 8 vertical and notch 2 lateral vibrations are measured and an optimum balance weight is attached to the rotor in order to reduce the notch 8 vertical vibration without substantially increasing the notch 2 lateral vibration. This is done using the sensitivity circle method as described below.

Figure 3:
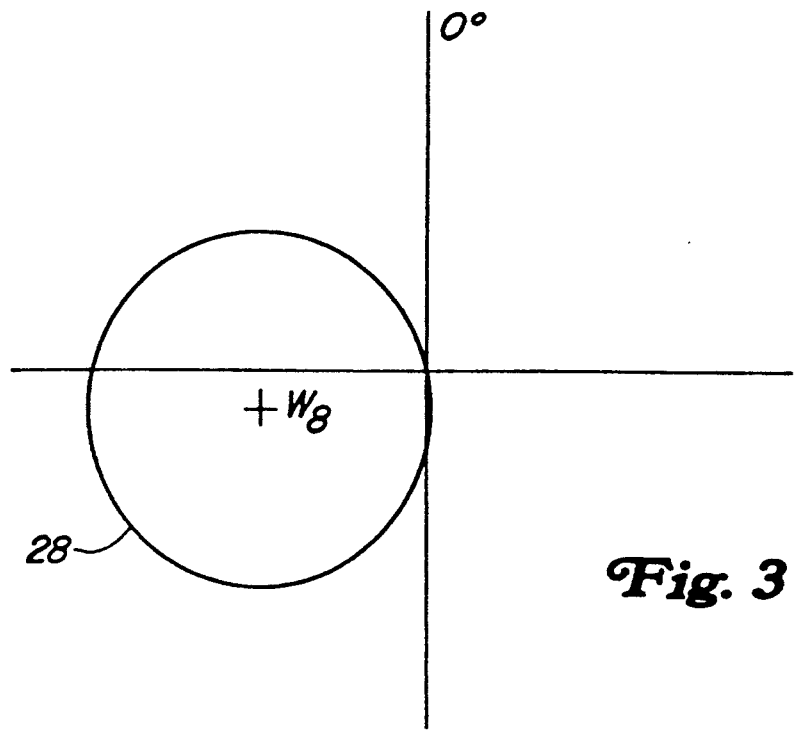
FIG. 3 illustrates a sensitivity circle for a particular weight applied to effect balancing.

The balance weights are plotted with respect to a coordinate system such that the distance of the point from the origin corresponds to the magnitude of the balance weight and the angular position of the balance weight is the angle of the line made by joining the point to the origin to the upper part of the vertical axis. In FIG. 3, the balance weight needed to balance rotor 16 at notch 8 (1050 RPM) is indicated by the point marked $W_8$. With the balance weight plotted, circles of equal vibration can be drawn which have their centers at the point representing the balance weight. These circles are called sensitivity circles. The radius of these circles depends on the value of the constant $\alpha$. FIG. 3 shows one such circle 28 which corresponds to the baseline data. Points on circle 28 give the magnitude and position of weights that would produce the same amplitude of vibration. Since circle 28 passes through the origin, it is the circle for the vibration amplitude with no balance weight.

Figure 4:
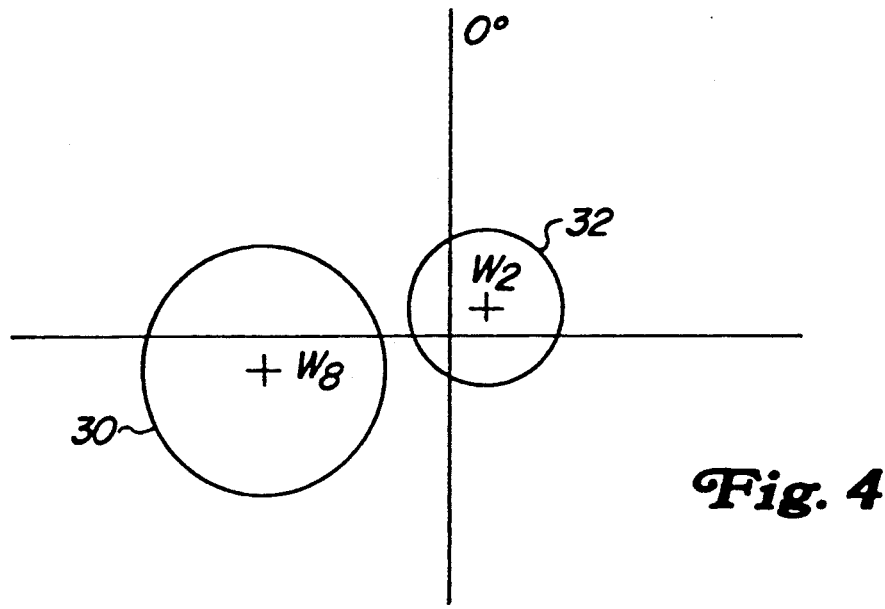
FIG. 4 illustrates sensitivity circles at two different speeds and weights for the alternator of FIG. 1.
Figure 5:
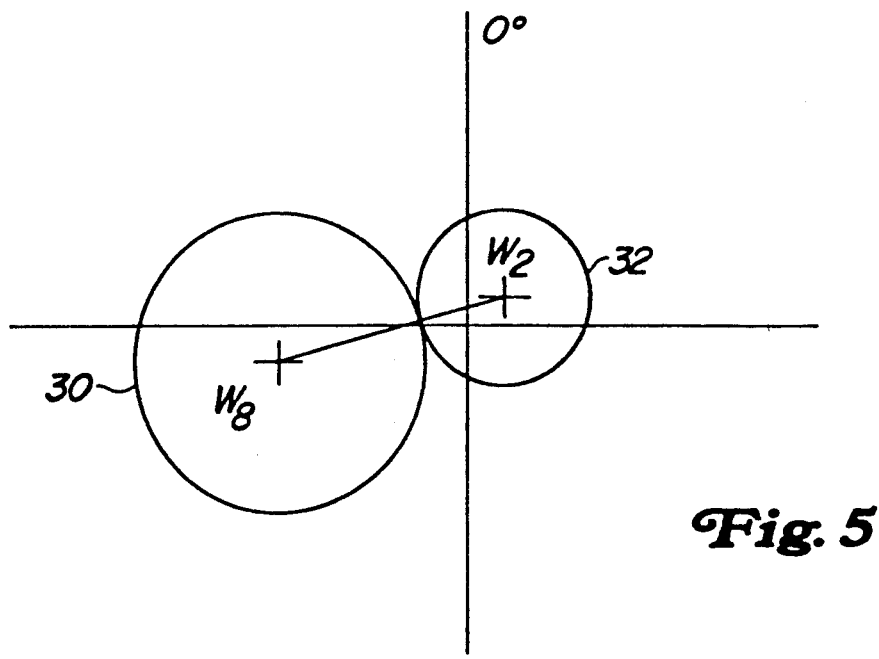
FIG. 5 illustrates how the sensitivity circles are used to identify a preferred weight for balancing.

FIG. 4 shows two circles 30, 32. Circle 30 has a center at $W_8$ which represents the notch 8 balance weight. Circle 32 has a center at $W_2$ which represents the notch 2 balance weight. The circles 30, 32 correspond to the same level of vibration. The optimum balance weight is the weight corresponding to the point of contact of circles 30, 32 for equal notch 8 and notch 2 vibration. This is shown in FIG. 5. The weight corresponding to this point of contact of the circles can be calculated as follows:

If $W_B$ represents the optimum balance weight, $\theta_B$ the angular position of this weight, and $\theta_8$ and $\theta_2$ the angular position of weight $W_8$ and $W_2$, respectively, the following equations can be written:

$$\{W_8 x\cos(\theta_8) - W_B x\cos(\theta_B)\} x\{a_2 + a_8\} = \{W_8 x\cos(\theta_8) - W_2 x\cos(\theta_2)\} x a_8 \quad (9)$$

$$\{W_8 x\sin(\theta_8) - W_B x\sin(\theta_B)\} x\{a_2 + a_8\} = \{W_8 x\sin(\theta_8) - W_2 x\sin(\theta_2)\} x a_8 \quad (10)$$

where $a_2$ is the value of $a$ for notch 2 and $a_8$ is the value of $a$ for notch 8.

Equations (9) and (10) can be solved for $W_B$ and $\theta_B$.

In practice, if the second trial weight does not give satisfactory results, the next trial weight can be calculated using data from the previous two trials and the baseline data. In this formulation, only the amplitudes of vibration are used. The phase angle is not used. This formulation is useful if the phase data is inaccurate.

Figure 6:
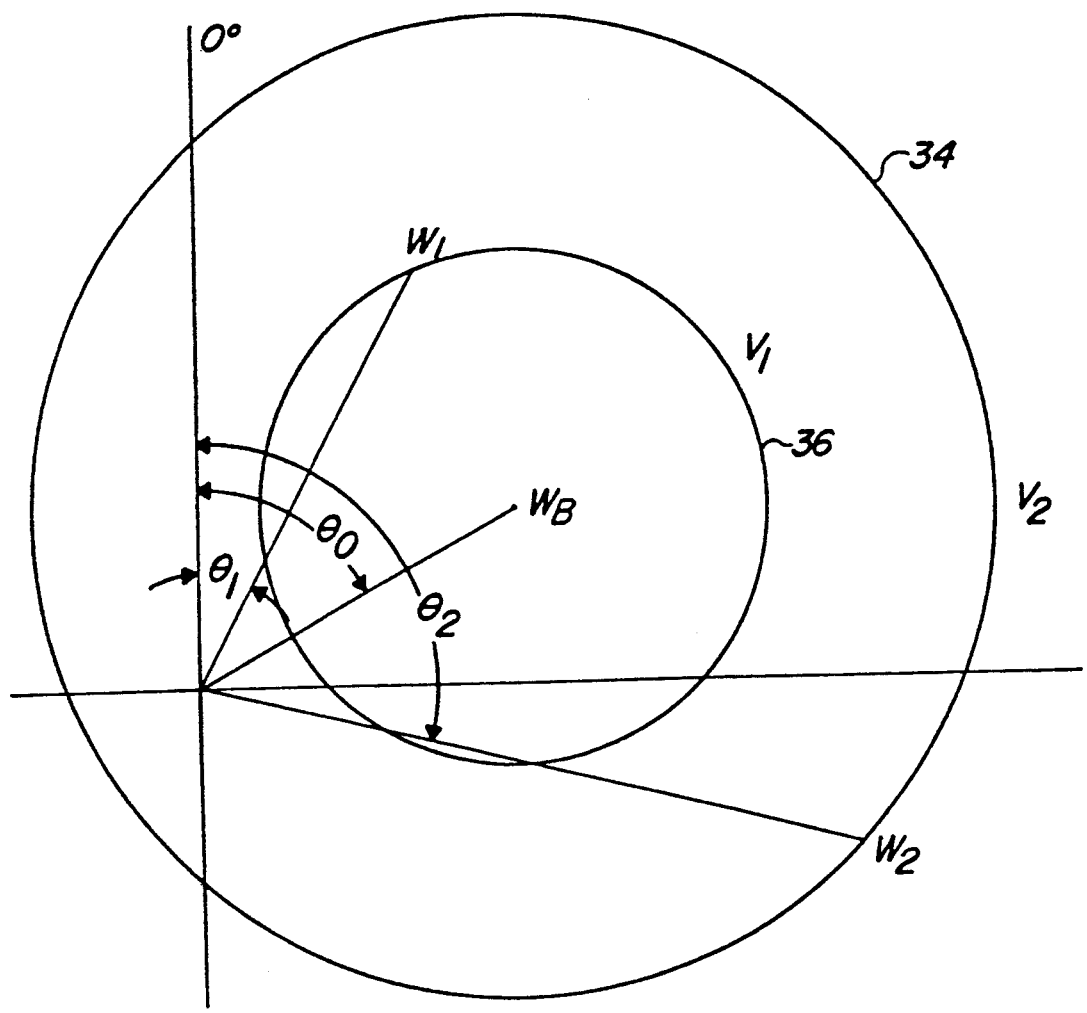
FIG. 6 illustrates sensitivity circles obtained with different weights during repetitive balancing checks.

FIG. 6 shows two sensitivity circles 34, 36. $W_B$ represents the balance weight needed to balance the alternator (at notch 2 or notch 8) and is the center for the two circles. For the first trial weight, $W_1$ is placed at position $\theta_1$, resulting in a vibration of $V_1$, represented by the smaller circle 36 in FIG. 6. $W_1$ will lie on this circle. For the second trial, weight $W_2$ is placed at position $\theta_2$, giving a vibration of $V_2$. This vibration is represented by the larger circle 34 in FIG. 6. $W_2$ lies on this circle. The following equations can be written and solved for $W_B$ and $\theta_0$.

$$a^2 x(V_0^2 - V_1^2) - 2x W_1 x V_0 x a x \{\cos(\theta_1 - \theta_0)\} + W_1^2 = 0 \quad (11)$$

$$a^2 x(V_0^2 - V_2^2) - 2x W_2 x V_0 x a x \{\cos(\theta_2 - \theta_0)\} + W_2^2 = 0 \quad (12)$$

The optimum balance weight for notch 2 and notch 8 can be obtained as described above in FIG. 3.

Once the necessary balance weight has been calculated, it must be attached to the alternator rotor yoke 16. The rotor yoke 16 has a set of twenty-four 0.5 inch tapped holes 23 that are used for bolting the selected balance weights to rotor yoke 16. Each balance weight is held in place by two 0.5 inch bolts and spacers (not shown). In order to obtain the full range of weights needed (from 1000 gm-inch to 20000 gm-inch) with increments of about 100 gm-inches with a minimum number of parts, the required weight is obtained as an effective weight from the vector combination of two weights selected from a set of eleven weights. Table 1 shows the weight of the eleven weight assemblies (each consisting of one weight, two bolts, and two spacers) in gram-inches. Table 2 shows all the possible combinations of the weight assemblies listed in Table 1, and the relative angle between the weights in each case.

A computer program selects the weight combination that gives the closest effective weight to the weight calculated and selects the holes so that the angular position is the closest possible to the calculated position. The computer program is written to interface with spectrum analyzer 12 and control the operation of the spectrum analyzer 12. It also does all of the calculations for determining the balance weights and their locations using the data collected with the help of spectrum analyzer 12. The vibration and phase data measured by the spectrum analyzer are automatically transferred to files in the computer and used by the program for the necessary calculations. The program is menu driven and requires minimum operator training in the use of spectrum analyzer 12. The operator is not required to do any calculations or analysis manually.

To more fully explain the method of the present invention, the following is a detail procedure for trim balancing of an alternator installed in a locomotive, which locomotive is in a condition to run at notch 2 and notch 8 in selfload in order to effect a trim balance. For purposes of description, the locomotive is assumed to be a Dash-8 locomotive manufactured by General Electric Company. Although the locomotive is not shown, various known elements will be referred to in the following description. With the locomotive in a load cell and with its diesel engine shut down, a safety panel on a B-side of a blower cab is removed to allow access to the alternator 14. A panel on the alternator covering the access opening 38 (FIG. 1) (held in place by bolts) is then removed. The panel is set aside and a test panel having an opening for passing sensor cables 40 is used during trim balancing. A light coat of black paint is applied over the outer two inches from an edge of the rotor yoke 16. The rotor is turned slowly over using a baring-over tool while the paint is being sprayed. A piece of reflecting tape (marker 22) is applied in line with one of the holes.

Tightly mounted by a mounting bracket 20 and bolt is the speed sensor 18. Light from the sensor 18 shines on the reflecting tape 22 when the alternator rotates. The test panel is bolted in place and the cable 40 from the sensor 18 is passed through a hole in the test panel and is pulled so that there is no slack. The end of the cable 40 is then connected to the spectrum analyzer 12.

The accelerometer 10 is placed on a block 42 at the middle of the alternator at the 3 o'clock position for measuring vibration in the lateral direction. The end of the accelerometer lead 44 is connected to the spectrum analyzer 12. The spectrum analyzer 12 and the computer 26 are turned on and the name of the customer and locomotive road number may then be entered. The computer 26 should indicate the engine speed and the amplitude of vibration (1/rev) at the alternator 14 in the lateral direction after the engine has been started and the locomotive is in selfload to check whether the instrumentation is working. If the instrumentation is working properly, the throttle should be moved to notch 8 and the engine should be run for ten minutes.

The throttle is moved to notch 2 for baseline data. After the engine has been running at notch 2 for two to three minutes, the operator may read notch 2 lateral vibration. The program will first read amplitude and then take an average of four phase angle readings. After the notch 2 readings have been taken, the accelerometer is moved to a vertical position and the throttle is moved to notch 8.

After the engine has been running at notch 8 for two to three minutes, the operator may read notch 8 vertical vibration. The program will first read amplitude and then an average of four phase angle readings to obtain baseline data.

The operator may then determine from the baseline data whether balancing is needed. One of the following criteria must be met for the alternator to be balanced:

(1) notch 2 and notch 8 vibrations must be 4.00 mils maximum; or (2) if the vibration exceeds 4.00 mils but does not exceed 6.00 mils—the difference between notch 2 and notch 8 vibrations must be 1.00 mil or less. Vibrations must not exceed 6.00 mils.

Next, the balance weight is calculated. The computer 26 will ask for the hole number at the reflecting tape 22 and will then give the following information: (1) parts to be used; (2) hole locations at which the weights are to be bolted; (3) actual weight in gm-inch; and (4) actual weight location in degrees. The engine is shut down, the panel removed from the alternator, and the engine barred over until the selected holes are at the access opening. Weights are bolted to the alternator rotor yoke using bolts and spacers and the bolts are then torqued to 55 to 60 ft-pounds. With the test panel bolted in place, the speed sensor cable is pulled through until all of the slack is taken up.

To determine trial weight data, the accelerometer 10 is placed on the block 42 at the horizontal position for lateral vibration measurement. The engine is started and the throttle is moved to notch 2. Trial weight data is selected from the program and then the operator enters the trial number, weight in gm-inches that has been added, and the actual location of the weight. After the engine has been running at notch 2 for two to three minutes, notch 2 lateral vibration may be read. The program will first read amplitude and then take an average of four phase angle readings. Once notch 2 readings have been taken, the accelerometer is moved to vertical position and the throttle moved to notch 8. After the engine has been running at notch 8 for two to three minutes, notch 8 vertical vibration may be read. The program will first read amplitude and then an average of four phase angle readings. To check whether balancing is complete, the operator should press 6 at the main menu of the program and enter the trial number. If balancing is to be repeated, go to the repeat trial weight step discussed below. If balancing is complete, go to the finish step discussed below.

To repeat trial weight step, the engine must again be shut down and the test panel removed from the alternator. The engine is then barred over until the first weight and then the second weight can be reached through the access opening and both weights are removed. With the baseline and trial data saved on computer, the balance weight is calculated by entering the trial number. The program will ask for the hole number at the reflecting tape 22 and will give the following information: (1) parts to be used; (2) hole locations at which the weights are to be bolted; (3) actual weight in gm-inch; and (4) actual weight location in degrees. The engine is then barred over until the selected holes are at the access opening 38. The required weights, bolts, and spacers are collected. The first weight is bolted to the alternator rotor yoke 16 at the first set of holes. The second weight is then bolted at the second set of holes. The test panel is again bolted in place and the speed sensor cable 40 pulled through until all of the slack is taken up. The trial weight data step described above is then repeated to collect data with the new trial weight.

To print data, the operator selects print baseline data or print trial data from the main menu on computer 26 and enters the trial number. If more than one trial weight was used, the print trial data step is repeated.

Upon completion of the procedure of the present invention, the operator exits the program and removes the test panel from the alternator 14. The speed sensor 18 and bracket 20 are then removed. If any varnish or paint under the weights exist, such varnish and paint is removed and bolts are torqued to 55 to 60 ft-pounds. A production panel is bolted to the alternator 14 over access 38. The accelerometer 10 is removed from the locomotive and the safety panel is replaced. The baseline, final notch 2 lateral and notch 8 vertical vibration amplitudes, and final balance weight are recorded for future reference. The computer 26 and spectrum analyzer 12 may then be turned off.

The first time the ONO SOKKI CF-250 spectrum analyzer 12 is used for trim balancing or if the setup of the analyzer 12 is changed, the spectrum analyzer must be initialized. To do so, the baud rate is set to 1200 with the spectrum analyzer 12 turned on before starting the balance program. Once the baud rate has been set, the computer 26 will complete the rest of the initialization.

The calibration is set for an accelerometer 10 with a sensitivity of 100 mV/G. If it is necessary to change the calibration, the calibration constant for the accelerometer being used must be determined beforehand and input to computer 26. The accelerometer 10 current may be set to 2.0 mA or 0.56 mA as needed. The spectrum analyzer 12 display shows the present setting. When initialization is complete, the program in computer 26 returns control to the main menu.

While the principles of the invention have now been made clear in an illustrative embodiment, it will become apparent to those skilled in the art that many modifications of the structures, arrangements, and components presented in the above illustrations may be made in the practice of the invention in order to develop alternate embodiments suitable to specific operating requirements without departing from the spirit and scope of the invention as set forth in the claims which follow.

TABLE 1

TRIM BALANCE WEIGHTS

| PART | WEIGHT (gm-inch) |
|---|---|
| 1 | 16355 |
| 2 | 16793 |
| 3 | 17231 |
| 4 | 18021 |
| 5 | 18809 |
| 6 | 19566 |
| 7 | 20375 |
| 8 | 21260 |
| 9 | 22049 |
| 10 | 22792 |
| 11 | 23447 |

TABLE 2

| | | ANGLE BETWEEN WEIGHTS | | | | | | |
|---|---|---|---|---|---|---|---|---|
| $W_1$ | $W_2$ | 180 | 165 | 150 | 135 | 120 | 105 | 90 |
| 16355 | 16355 | 0 | 4270 | 8466 | 12518 | 16355 | 19913 | 23129 |
| 17231 | 16355 | 876 | 4469 | 8734 | 12878 | 16810 | 20458 | 23757 |
| 18021 | 16355 | 1666 | 4781 | 9042 | 13245 | 17248 | 20968 | 24336 |
| 18021 | 17231 | 790 | 4667 | 9156 | 13510 | 17639 | 21469 | 24933 |
| 18809 | 16355 | 2454 | 5195 | 9405 | 13646 | 17710 | 21495 | 24925 |
| 18809 | 17231 | 1578 | 4958 | 9452 | 13869 | 18072 | 21975 | 25509 |

TABLE 2-continued

| | | \multicolumn{7}{c}{ANGLE BETWEEN WEIGHTS} |
|---|---|---|---|---|---|---|---|---|
| W₁ | W₂ | 180 | 165 | 150 | 135 | 120 | 105 | 90 |
| 18809 | 18021 | 788 | 4870 | 9563 | 14113 | 18428 | 22429 | 26049 |
| 19566 | 16355 | 3211 | 5667 | 9801 | 14063 | 18175 | 22015 | 25501 |
| 19566 | 17231 | 2335 | 5332 | 9787 | 14246 | 18509 | 22477 | 26072 |
| 19566 | 18021 | 1545 | 5140 | 9842 | 14455 | 18841 | 22914 | 26600 |
| 19566 | 18809 | 757 | 5065 | 9959 | 14702 | 19199 | 23369 | 27141 |
| 20375 | 16355 | 4020 | 6235 | 10269 | 14538 | 18692 | 22586 | 26127 |
| 20375 | 17231 | 3144 | 5815 | 10196 | 14681 | 18999 | 23029 | 26684 |
| 20375 | 18021 | 2354 | 5528 | 10194 | 14854 | 19306 | 23448 | 27201 |
| 20375 | 18809 | 1566 | 5345 | 10254 | 15065 | 19639 | 23886 | 27729 |
| 20375 | 19566 | 809 | 5275 | 10367 | 15303 | 19983 | 24323 | 28248 |
| 21260 | 16355 | 4905 | 6910 | 10827 | 15091 | 19281 | 23227 | 26823 |
| 21260 | 17231 | 4029 | 6419 | 10695 | 15193 | 19559 | 23649 | 27366 |
| 21260 | 18021 | 3239 | 6050 | 10637 | 15327 | 19840 | 24050 | 27870 |
| 21260 | 18809 | 2451 | 5767 | 10637 | 15500 | 20147 | 24470 | 28386 |
| 21260 | 19566 | 1694 | 5587 | 10692 | 15702 | 20466 | 24890 | 28893 |
| 21260 | 20375 | 885 | 5505 | 10810 | 15954 | 20832 | 25356 | 29447 |
| 22049 | 16355 | 5694 | 7550 | 11360 | 15610 | 19825 | 23811 | 27453 |
| 22049 | 17231 | 4818 | 7007 | 11181 | 15677 | 20078 | 24216 | 27983 |
| 22049 | 18021 | 4028 | 6581 | 11077 | 15779 | 20336 | 24602 | 28477 |
| 22049 | 18809 | 3240 | 6226 | 11028 | 15920 | 20621 | 25005 | 28982 |
| 22049 | 19566 | 2483 | 5964 | 11035 | 16090 | 20918 | 25410 | 29479 |
| 22049 | 20375 | 1674 | 5781 | 11099 | 16308 | 21261 | 25860 | 30022 |
| 22049 | 21260 | 789 | 5707 | 11235 | 16590 | 21665 | 26372 | 30629 |
| 22792 | 16355 | 6437 | 8175 | 11888 | 16118 | 20352 | 24372 | 28053 |
| 22792 | 17231 | 5561 | 7595 | 11669 | 16155 | 20583 | 24761 | 28572 |
| 22792 | 18021 | 4771 | 7124 | 11525 | 16229 | 20821 | 25132 | 29056 |
| 22792 | 18809 | 3983 | 6714 | 11434 | 16340 | 21085 | 25521 | 29551 |
| 22792 | 19566 | 3226 | 6387 | 11397 | 16481 | 21362 | 25913 | 30038 |
| 22792 | 20375 | 2417 | 6123 | 11414 | 16670 | 21685 | 26348 | 30571 |
| 22792 | 21260 | 1532 | 5947 | 11497 | 16917 | 22066 | 26845 | 31168 |
| 22792 | 22049 | 743 | 5899 | 11628 | 17174 | 22430 | 27304 | 31712 |
| 23447 | 16355 | 7092 | 8742 | 12371 | 16581 | 20827 | 24875 | 28588 |
| 23447 | 17231 | 6216 | 8135 | 12120 | 16592 | 21039 | 25249 | 29098 |
| 23447 | 18021 | 5426 | 7631 | 11944 | 16642 | 21260 | 25609 | 29572 |
| 23447 | 18809 | 4638 | 7181 | 11819 | 16729 | 21506 | 25986 | 30059 |
| 23447 | 19566 | 3881 | 6806 | 11747 | 16846 | 21768 | 26365 | 30538 |
| 23447 | 20375 | 3072 | 6480 | 11724 | 17008 | 22072 | 26788 | 31063 |
| 23447 | 21260 | 2187 | 6225 | 11762 | 17228 | 22434 | 27271 | 31650 |
| 23447 | 22049 | 1398 | 6098 | 11852 | 17458 | 22780 | 27718 | 32186 |
| 23447 | 22792 | 655 | 6070 | 11984 | 17705 | 23126 | 28153 | 32699 |
| 16793 | 16355 | 438 | 4348 | 8590 | 12692 | 16578 | 20182 | 23441 |
| 17231 | 16793 | 438 | 4462 | 8816 | 13027 | 17016 | 20715 | 24061 |
| 18021 | 16793 | 1228 | 4704 | 9088 | 13371 | 17439 | 21216 | 24633 |
| 18809 | 16793 | 2016 | 5059 | 9418 | 13751 | 17886 | 21732 | 25215 |
| 19566 | 16793 | 2773 | 5485 | 9784 | 14148 | 18337 | 22243 | 25784 |
| 20375 | 16793 | 3582 | 6012 | 10223 | 14603 | 18841 | 22804 | 26404 |
| 21260 | 16793 | 4467 | 6655 | 10753 | 15136 | 19416 | 23435 | 27092 |
| 22049 | 16793 | 5256 | 7270 | 11262 | 15637 | 19947 | 24010 | 27716 |
| 22792 | 16793 | 5999 | 7879 | 11770 | 16131 | 20463 | 24563 | 28310 |
| 23447 | 16793 | 6654 | 8433 | 12238 | 16581 | 20929 | 25059 | 28840 |

What is claimed is:

1. A method for balancing a rotor of an alternator in a diesel-electric locomotive, the rotor being drivingly coupled to a power output shaft of an internal combustion diesel engine, speed sensing means coupled to the rotor for providing output signals representative of instantaneous rotational velocity of the rotor and vibration sensing means coupled to the rotor for providing signals representative of instantaneous amplitude of vibrational motion of the rotor, the method comprising the steps of:

energizing the diesel engine for accelerating the rotor to a first preselected rotational velocity;
determining a first rotor unbalance from the signals representative of instantaneous velocity and vibration amplitude at the first preselected velocity;
energizing the engine for accelerating the rotor to a second preselected rotational velocity;
determining a second rotor unbalance at the second velocity from the signals representative of instantaneous velocity and vibration;
wherein the step of determining each of the first and second rotor unbalance includes the steps of:
locating a first fixed position marker on the rotor;
positioning the speed sensor adjacent the position marker for detecting the rotational velocity of the rotor from passage of the position marker by the speed sensor; and
detecting the phase angle of any vibration of the rotor;
combining the first and second rotor unbalance determinations for identifying a first correction weight and position thereof for minimizing the first and the second rotor unbalance;
installing the first correction weight to correct the rotor unbalance;
wherein the signals from the speed sensor and from the accelerometer are coupled to a spectrum analyzer, the spectrum analyzer being coupled to a computer, the computer being programmed to read the rotor speed and amplitude of vibration from the spectrum analyzer, the method including the further steps of:

sampling the first rotor speed from the spectrum analyzer and storing the sampled speed in the computer;

sampling the amplitude of vibration in a lateral direction and determining the average phase angle of the vibration at the first sampled speed;

sampling the second rotor speed from the spectrum analyzer and storing the sampled speed in the computer;

sampling the amplitude of vibration in a vertical direction and determining the average phase angle of the vibration at the second sampled speed;

computing, from the sampled amplitude and vibration phase angle at each speed, a position and weight for attachment to the rotor for minimizing the vibration conjointly in the vertical and lateral directions; and attaching the weight to the rotor in the computer position.

2. The method of claim 1 and including the steps of repeating the steps of energizing through the second step of determining to verify correction of rotor unbalance using the first correction weight.

3. The method of claim 2 and including, when rotor unbalance is not corrected with the first weight such that vibration is less than a preselected maximum value, the step of combining the rotor unbalance signals obtained without the first correction weight with the rotor unbalanced signals obtained with the first correction weight to identify a second correction weight and position thereof to correct rotor unbalance.

4. The method of claim 1 wherein the weight comprises at least one weight selected from a predetermined number of weights of different values, the method including the further step of selecting, in the computer, a combination of weights from the predetermined number of weights closest to the computer weight.

5. The method of claim 1 wherein the steps of sampling the vibration in the vertical and lateral directions includes the steps of positioning the accelerometer in a vertical and a lateral position adjacent the rotor, respectively.

6. The method of claim 5 wherein the steps of sampling, computing and attaching are repeated until the amplitude of vibration at each of the first and second speeds is less than a preselected value.

7. The method of claim 5 wherein the steps of sampling, computing and attaching are repeated until the amplitude of vibration of the first and second speeds is less than a first preselected value and the difference in amplitude of vibration between the first and second speeds is less than a second preselected value.

* * * * *